(12) United States Patent
Peters et al.

(10) Patent No.: US 6,215,780 B1
(45) Date of Patent: Apr. 10, 2001

(54) METHOD AND SYSTEM FOR SYNCHRONOUS CODE DIVISION MULTIPLEXED COMMUNICATIONS

(75) Inventors: Robert Anthony Peters, Silver Spring, MD (US); Shawn Wesley Hogberg, Chandler, AZ (US); Thomas Peter Emmons, Jr., Mesa, AZ (US); James William Startup, Tempe, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/116,910

(22) Filed: Jul. 17, 1998

(51) Int. Cl.[7] .................................................. H04J 13/00
(52) U.S. Cl. ........................... 370/342; 370/517; 370/320
(58) Field of Search .................................. 370/350, 316, 370/320, 324, 342, 441, 479, 517, 518, 519, 515, 516; 455/12.1, 13.2; 375/356, 367, 371, 205

(56) References Cited

U.S. PATENT DOCUMENTS

| | | | |
|---|---|---|---|
| 5,305,468 | 4/1994 | Bruckert et al. | 455/69 |
| 5,363,375 | * 11/1994 | Chuang et al. | 370/350 |
| 5,383,225 | 1/1995 | Aguirre et al. | 375/106 |
| 5,463,400 | 10/1995 | Tayloe | 342/352 |
| 5,640,386 | 6/1997 | Wiedeman | 370/320 |
| 5,666,122 | 9/1997 | Carter | 342/357 |

FOREIGN PATENT DOCUMENTS

| | | | |
|---|---|---|---|
| 0827293 | 3/1998 | (EP) | H04B/7/216 |
| 9515626 | 6/1995 | (WO) | H04J/13/06 |

* cited by examiner

*Primary Examiner*—Huy D. Vu
(74) *Attorney, Agent, or Firm*—Gregory J. Gorrie; Frank J. Bogacz

(57) ABSTRACT

In a code division multiplexed system, a subscriber unit (260, FIG. 1), which includes a pseudonoise code generator (70), is synchronized with the pseudonoise code generator (220) of a communications node (200). Synchronization between the pseudonoise code generators (70, 220) is achieved through measuring the time delay of a signal transmitted from the communications node (200) to the subscriber unit (260) and advancing the code generator of the subscriber unit in accordance with the time delay. This permits transmissions from the subscriber unit (260) to be received synchronously at the satellite. The synchronization is maintained through the periodic transmission from the communications node (200) to the subscriber unit (260) of a message which commands the subscriber unit (260) to adjust the timing of its pseudonoise code generator. The resulting synchronous code division multiplexed system offers increased capacity over conventional systems.

18 Claims, 4 Drawing Sheets ature of the invention

METHOD AND SYSTEM FOR SYNCHRONOUS CODE DIVISION MULTIPLEXED COMMUNICATIONS

FIELD OF THE INVENTION

The invention relates generally to wireless communication systems and, more particularly, to code division multiplexed communication systems.

BACKGROUND OF THE INVENTION

In a code division multiplexed communication system, an information signal, typically in digital form, is multiplied by a unique pseudonoise code, upconverted to a carrier frequency, and transmitted from a subscriber unit to a receiving station. Generally, the bandwidth of the pseudonoise code is much greater than the bandwidth of the information signal. Thus, the effect of the multiplication of the information signal by the pseudonoise code is to greatly increase the bandwidth occupied by the product signal. Each subscriber unit using the code division multiplexed communication system is assigned a different unique pseudonoise code with all subscriber units sharing the same product signal bandwidth.

At a receiving end of the communication system, the signal is first received through an appropriate antenna and downconverted. The downconverted signal is correlated with the pseudonoise code assigned to the particular transmitting subscriber unit. During the correlation process, a product signal of the particular transmitting subscriber unit is separated from the signals of other transmitting subscriber units. The correlated output represents the signal from the particular transmitting subscriber unit. The cross-correlated outputs (e.g. signals from other transmitting subscriber units) are desirably minimized. By maximizing correlated outputs and minimizing cross-correlated outputs, the number of subscriber units which make use of the communication system is increased.

Therefore, what is needed are a method and system for minimizing the cross-correlated outputs of the correlator of a code division multiplexed communication system. What is also needed are a method and system for maximizing the correlated outputs of the correlator of a synchronizing the code division multiplexed communication system. What is also needed is a code division multiplexed communications system which has a greater capacity than conventional code division multiplexed systems.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

DESCRIPTION OF THE PREFERRED EMBODIMENTS

In a code division multiplexed communication system, correlated outputs can be maximized and cross-correlated outputs minimized by synchronizing the code generators of the transmitting and receiving subscriber units. (This is herein referred to as a synchronous code division multiplexed communication system.) In general, greater synchronization reduces cross-correlation products which, in turn, increases the capacity (e.g. the number of subscriber units) of the communication system. Additionally, in a code division multiplexed communication system where earth-based subscriber units communicate with a satellite in a low earth orbit, establishing synchronization between the satellite and a subscriber unit can be difficult due to the time required for a signal to propagate from a transmitting node to a receiving node. In typical terrestrial code division multiplexed systems, where the time required for a transmitted signal to travel from a subscriber to a base station can be significant when compared to the rate at which the code generators operate. Additionally, for the case of a low earth orbit satellite which moves relative to an earth-based subscriber unit, maintaining synchronization between the subscriber unit and the satellite communications node can be problematic as well.

The present invention provides, among other things, a method and system for synchronous code division multiplexed communications in a satellite communications system. A significant increase in the number of subscriber units which communicate with a communications node is achieved. The timing of pseudonoise code generators are preferably controlled in both the receiving and transmitting subscriber units. Through this control, the cross-correlated outputs at the correlator of the receiving communications node are reduced which enables communications nodes to be constructed which service a greater number of subscriber units than previously possible. A more cost-effective delivery of communication services to subscribers with only a minimal increase in complexity is provided.

Figure 1:
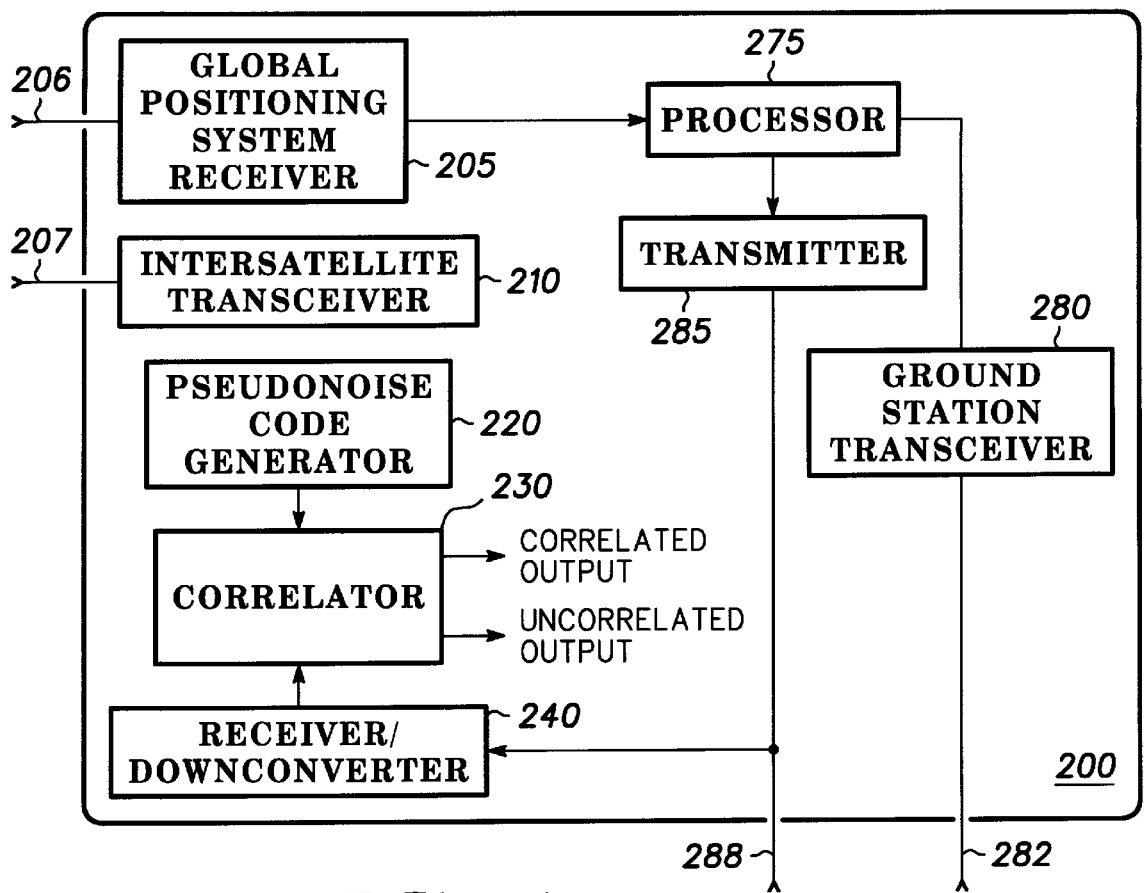
FIG. 1 illustrates a satellite communications node in accordance with a preferred embodiment of the invention.

FIG. 1 illustrates a satellite communications node in accordance with a preferred embodiment of the invention. Communications node 200 provides synchronous code division multiplexed communications with subscriber units. In FIG. 1, communications node 200 comprises global positioning system receiver 205 coupled to antenna 206 which receive timing signals from a component satellite of a global positioning system. In a preferred embodiment, received timing signals from global positioning system receiver 205 are input to processor 275. Processor 275, among other things, maintains an accurate timing reference which enables pseudonoise code generator 220 to maintain a stable time base. Processor 275 also conveys timing signals to earth-based subscriber units through transmitter 285 and antenna 288. The subscriber units possess pseudonoise code generators which perform a substantially identical functions as pseudonoise code generator 220.

Communications node 200 also comprises intersatellite transceiver 210 coupled to antenna 207 which provide a substantially high bandwidth data link to other similar communications nodes which comprise the code division multiplexed communications system. Communications node 200 also includes pseudonoise code generator 220 as well as receiver/downconverter 240. Outputs of pseudonoise code generator 220 and receiver/downconverter 240 are input to correlator 230. Correlator 230 of communications node 200 provides an output for each earth-based subscriber unit. In a preferred embodiment, communications node 200 also provides a link to ground base stations through ground link transceiver 280.

Figure 2:
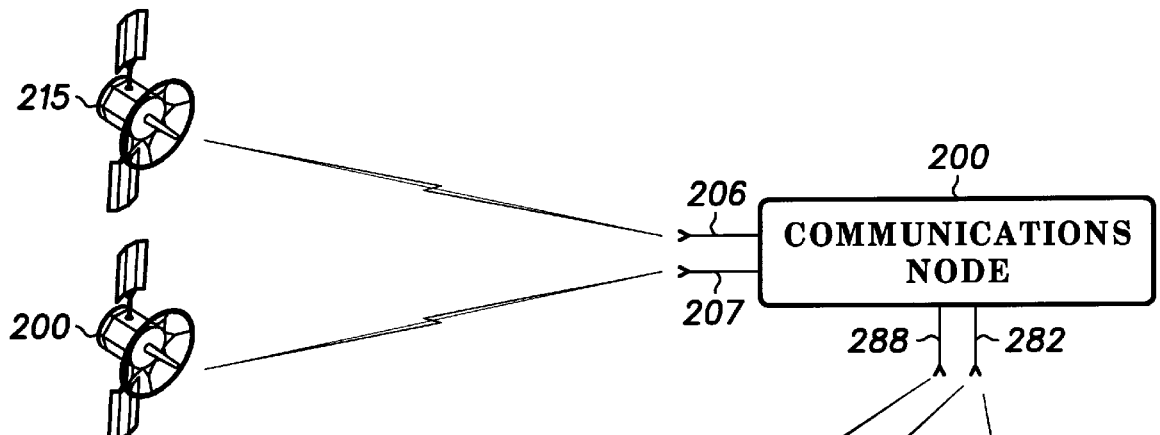
FIG. 2 illustrates a satellite communications node in low earth orbit in accordance with a preferred embodiment of the invention.
Figure 2:
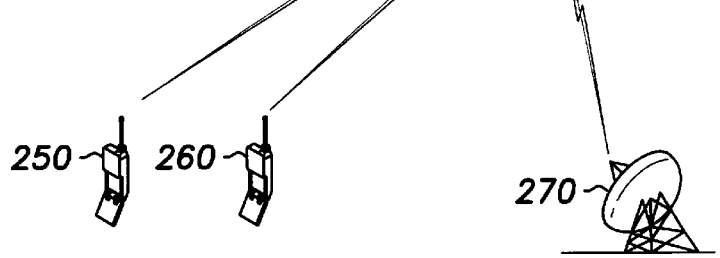

FIG. 2 illustrates a satellite communications node in low earth orbit in accordance with a preferred embodiment of the invention. FIG. 2 illustrates communications node 200 in communication with global positioning satellite 215, and similar communications node 200 through antennas 206 and 207, respectively. Communications node 200 of FIG. 2 also provides communication with subscriber units 250 and 260 through antenna 288. Communications between communications node 200 and ground base station 270 occurs by way of antenna 282.

Figure 3:
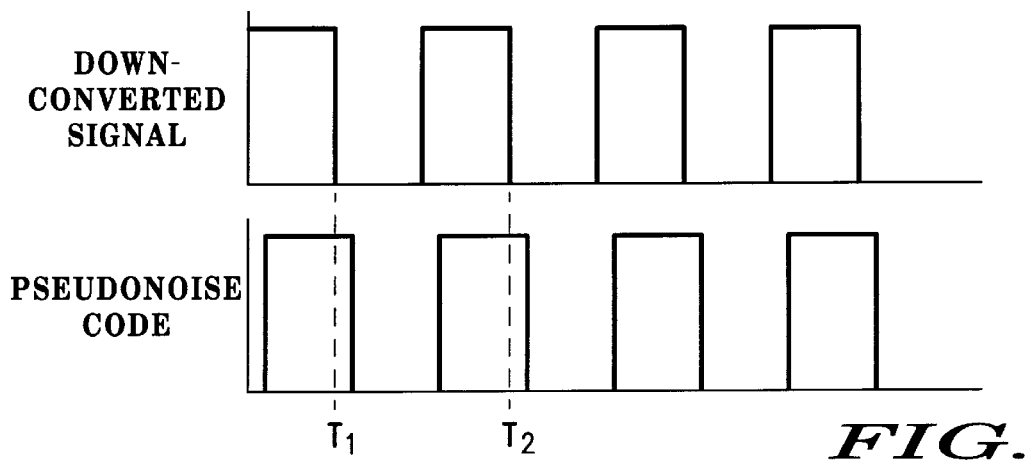
FIG. 3 illustrates an unsynchronization in timing of the downconverted signal received from a transmitting subscriber unit and the pseudonoise code generator of the receiving communications node.

FIG. 3 illustrates an unsynchronization in timing of the downconverted signal received from a transmitting subscriber unit and the pseudonoise code generator of the receiving communications node. As shown in FIG. 3, the downconverted signal is clocked on the falling edge of the signal with time T2 being one clock cycle later than time T1. Note that the downconverted signal of FIG. 3 is unsynchronized with the clock of the pseudonoise code generator of the receiving communications node.

Figure 4:
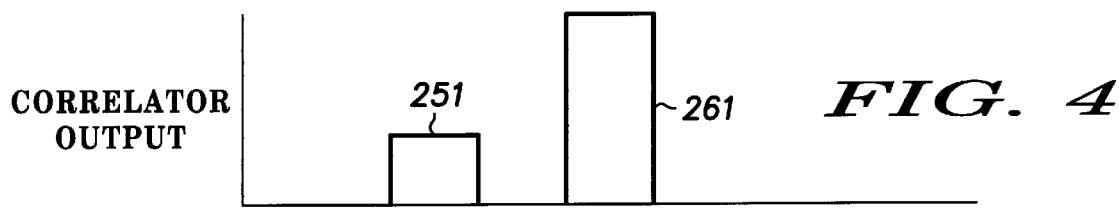
FIG. 4 illustrates a correlator output when pseudonoise code generators of a transmitting and a receiving node are unsynchronized.

FIG. 4 illustrates a correlator output when pseudonoise code generators of a transmitting and a receiving node are unsynchronized. As shown in FIG. 4, (using the elements of FIG. 1 as an example) the unsynchronization in time between the downconverted signal (representing an output from receiver/downconverter 240) and the pseudonoise code (representing an output of pseudonoise code generator 220) creates correlated output 261 and cross-correlated output 251. In this example, as the unsynchronization increases, correlator output 261 (representing an information signal from subscriber unit 260) decreases, while cross-correlated output 251 (representing an information signal from subscriber unit 250 of FIG. 2) increases. Therefore, when subscriber unit 250 begins transmitting a signal, the cross-correlated output from subscriber unit 260 (of FIG. 2) interferes with the correlated output for subscriber unit 250.

Thus, when an unsynchronization in timing occurs, the resulting condition causes correlator 230 to generate interference in the form of cross-correlated outputs which interfere with correlated outputs from other subscriber units. Generally, as signals from more transmitting subscriber units are received by communications node 200, the greater the amount of cross-correlated interference signals which are present at the output of correlator 230.

Figure 5:
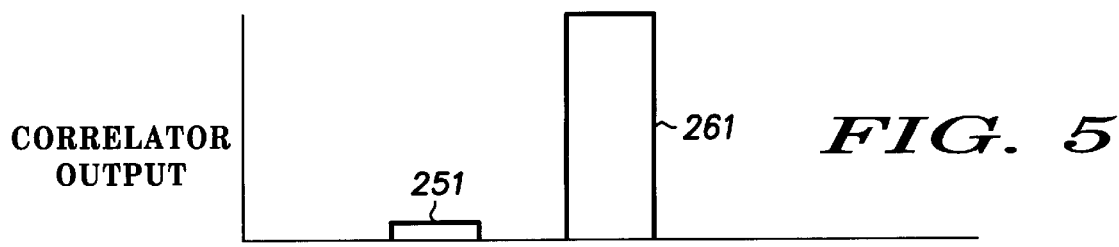
FIG. 5 illustrates a correlator output when pseudonoise code generators of transmitting and receiving nodes are synchronized in accordance a preferred embodiment of the invention.

FIG. 5 illustrates a correlator output when pseudonoise code generators of transmitting and receiving nodes are synchronized in accordance a preferred embodiment of the invention. As shown in FIG. 5, (using the elements of FIG. 1 as an example) under synchronized receive conditions the cross-correlated output becomes vanishingly small while the correlated output is maximized. As previously mentioned herein, these small cross-correlation products, such as that shown in FIG. 5, represent a desirable condition which allows an increase in the number of users which can communicate with communications node 200.

Communications node 200 preferably determines the offset error in timing from the correlator 230 for each of the signals from subscriber units 250 and 260. This offset error is the timing error in the pseudonoise code necessary to synchronize the codes. This offset error is used to transmit timing error information to the subscriber units, 250 and 260.

Figure 6:
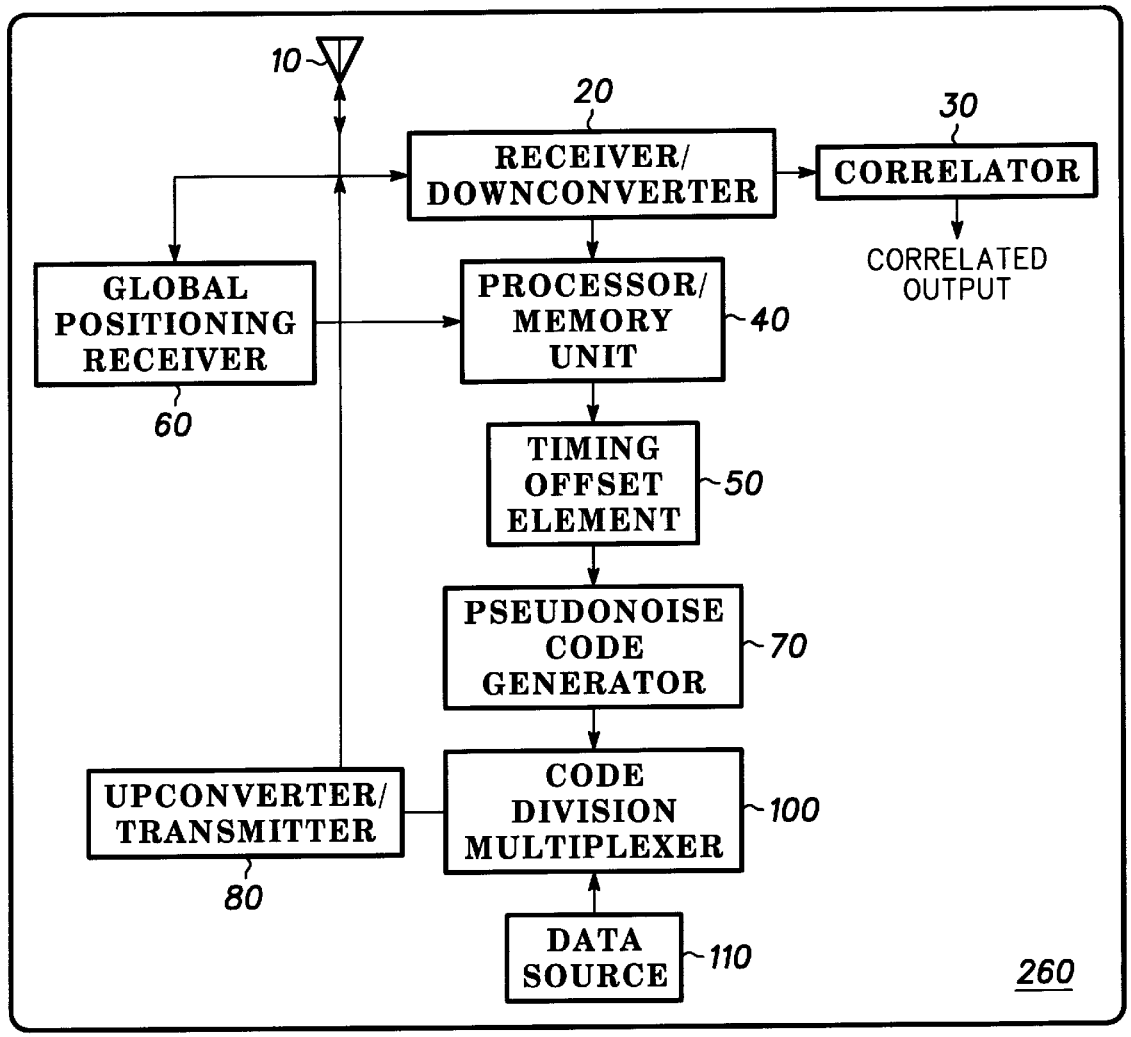
FIG. 6 illustrates a subscriber unit transceiver which performs synchronous code division multiplexed communications with a communications node in accordance with a preferred embodiment of the invention.

FIG. 6 illustrates a subscriber unit transceiver which performs synchronous code division multiplexed communications with a communications node in accordance with a preferred embodiment of the invention. In FIG. 6, antenna 10 facilitates the transmission and reception of signals to and from subscriber unit 260. Receiver/downconverter 20 is coupled to antenna 10 and to correlator 30. Receiver/downconverter 20 and correlator 30, perform substantially identical functions as receiver/downconverter 240 and correlator 230 of communications node 200. Similarly, pseudonoise code generator 70 performs a substantially identical function as that performed by pseudonoise code generator 220 in communications node 200.

In a preferred embodiment, subscriber unit 260 also includes data source 110 which provides a data signal comprising digitized voice (when used in conjunction with a vocoder), facsimile data, or other digital information to code division multiplexer 100. The output of pseudonoise code generator 70 is also incident on code division multiplexer 100. Code division multiplexer 100 multiplies the data from data source 110 according to the unique code generated by pseudonoise code generator 70. The code division modulated output of code division multiplexer 100 is then up-converted and transmitted through up-converter/transmitter 80 and conveyed to antenna 10. The radiated signal can then be received by an antenna, such as antenna 288, of communications node 200.

Subscriber unit 260 additionally comprises global positioning system receiver 60. Global positioning system receiver 60 can receive signals from global positioning system satellites through antenna 10, or may make use of a separate antenna (not shown). Global positioning system receiver 60 is functionally coupled to processor/memory unit 40 and provides the time base for other functions of subscriber unit 260 such as current time and date. Global positioning system receiver 60 (as well as global positioning system receiver 205 of FIG. 1) preferably receives signals from a component of the global positioning system currently operated by the United States Department of Defense. In accordance with an alternative embodiment, communications node 200 receives signals from a component of an equivalent system such as the GLONASS System currently operated by the Russian Federation.

Subscriber unit 260 further comprises a timing offset element 50 which provides a timing offset to pseudonoise code generator 70. Through the use of timing offset element 50, the pseudonoise code output of pseudonoise code generator 70 is desirably synchronized with pseudonoise code generator 220 of communications node 200 (FIG. 1). Subscriber unit 260 also includes other elements for communicating within a code division multiplexed system.

As the basic hardware elements of communications node 200 and subscriber units 250 and 260 have now been described, the methods which utilize these elements to provide synchronous code division multiplexed communications are described below.

Figure 7:
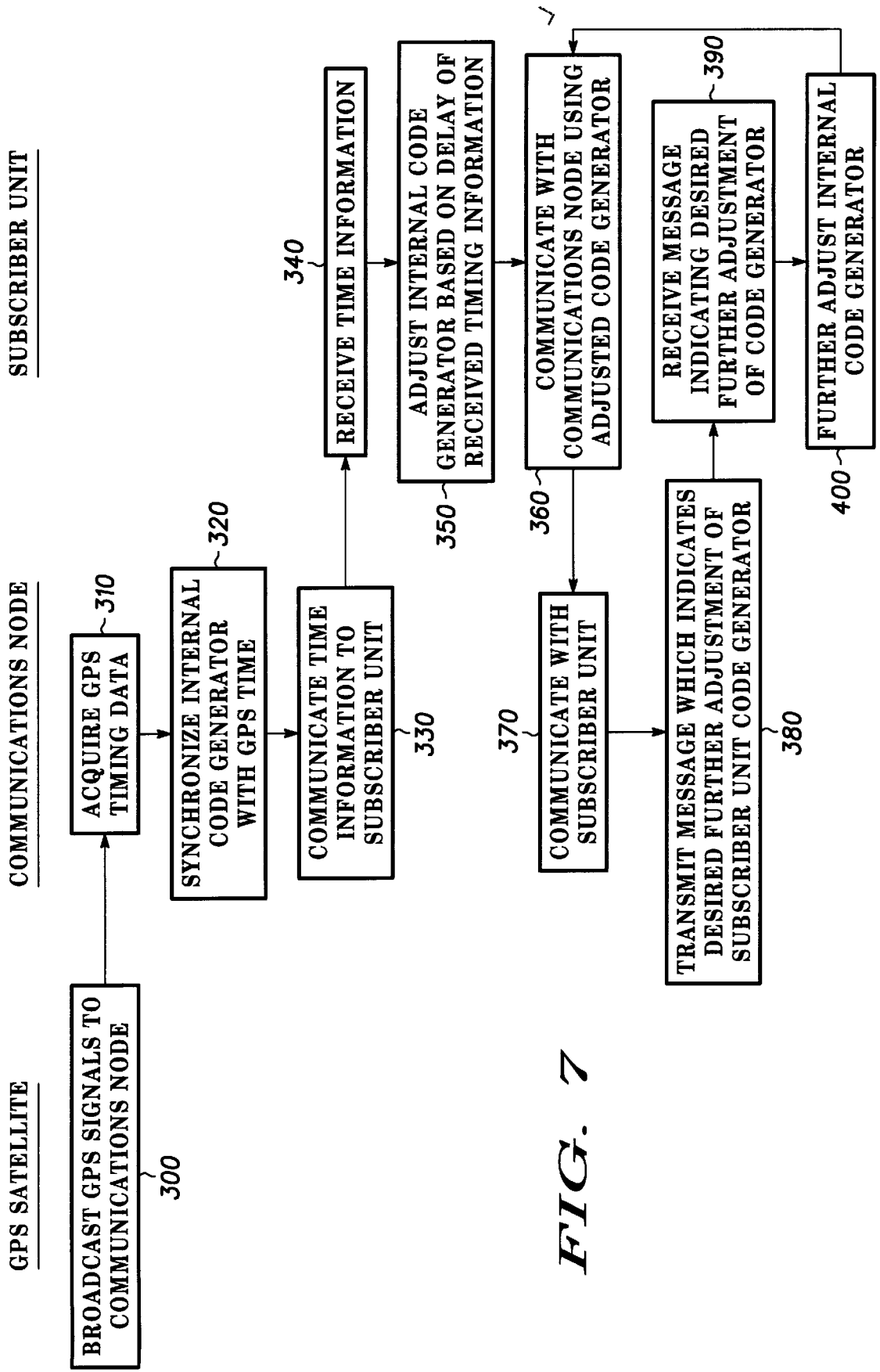
FIG. 7 illustrates a simplified flowchart of a method for providing synchronous code division multiplexed communications in accordance with a preferred embodiment of the invention.

FIG. 7 illustrates a simplified flowchart of a method for providing synchronous code division multiplexed communications in accordance with a preferred embodiment of the invention. Communications node 200 of FIG. 1 operating in conjunction with subscriber unit 260 are suitable for performing the method. In step 310, the communications node acquires global positioning system timing and position information from a global positioning system satellite. The communications node updates its own position and may use past position updates to generate its velocity vector. For satellite systems, this information comprises the satellite's ephemeris. Other techniques well known in the field may be used to generate the communication node ephemeris. In step 320, timing data from the global positioning system receiver is used by the communications node to synchronize an internal code generator with the global positioning system time. In step 330, the time information is communicated from the communications node to a subscriber unit. In a preferred embodiment, the information in step 330 may be a code division multiplexed pilot channel synchronized to global positioning system time. In an alternative embodiment, the information of step 330 includes actual timing signals. In another alternative embodiment, the information of step 330 includes transmitting ephemeris data, such as a position and velocity of the communications node, to a subscriber unit.

In step 340, a subscriber unit receives time information from a communications node through a suitable antenna. Step 340 also includes down converting and conveying the timing data to a processor/memory unit. In step 350, the subscriber unit advances an internal code generator based on the time delay of the received timing information. This may be performed by comparing the received timing information with a current time received through a global positioning system receiver included within the subscriber unit. The timing advance is equal and opposite to the value for the timing delay. Step 350 may also include using satellite ephemeris data to estimate a time delay based on the ephemeris of the communications node transmitted in step 330. Through the use of the ephemeris of the communications node and position data from the subscriber unit global positioning system receiver, the subscriber unit can perform a position calculation in order to estimate the distance between itself and the communications node. This estimate can then be used to determine a time delay. Additionally, by utilizing the velocity vector portion of the communications node ephemeris, the subscriber unit can predict the distance to the communications node at a future time and therefore calculate the corresponding time delay. These calculations can be performed through the use of a suitable processor/memory unit known to those skilled in the art.

In step 360, the timing delay is conveyed from subscriber unit processor/memory unit to a pseudonoise code generator by way of a timing offset element. In response to the timing delay, the pseudonoise code generator can advance the pseudonoise code to compensate for the timing delay. This allows the subscriber unit to communicate with a communications node using an a pseudonoise code which will be time-synchronized with the pseudonoise code generator of the communications node when received at the node. The path delay between the subscriber unit and the communications node is equal to the timing advance calculated in step 350.

In step 370, the subscriber unit communicates synchronous code division multiplexed communication signal with the communications node. In step 370, the communications node desirably employs "multi-user detection" to subtract out small cross-correlation products received from subscribers. Multi-user detection, allows some relaxation in the synchronization of the pseudonoise code generators in a subscriber unit and a communications node. In multi-user detection, the cross-correlated outputs of the correlator of a code division multiplexed communication system are subtracted from the correlated output. This allows the code division multiplexed communication system to function synchronously even with some unsynchronization in timing between the code generators.

In step 380, the communications node measures the timing offset of the received signal and transmits a message which indicates the desired direction of a further adjustment to the code generator of the subscriber unit. In a preferred embodiment, the transmitted message of step 380 is comprised of a single binary digit transmitted on a non-traffic communications channel. In this embodiment, a binary one indicates that timing should be advanced by a specific predetermined amount while a binary zero indicates that timing should be delayed by a specific predetermined amount. Step 380 allows the pseudonoise code generator of the subscriber unit to maintain synchronization with the pseudonoise code generator of the communications node through a periodic update from the communications node.

In step 390, the subscriber unit receives a message which indicates the desired correction of the internal clock. In step 400, the adjustment is made to the subscriber unit pseudonoise code generator offset calculation. The subscriber unit then returns to step 360 where communications is conducted with the communications node.

In an alternative embodiment, the transmitted messages of step 380 are comprised of a binary word which conveys a magnitude as well as a timing advance or delay indicator. This allows the pseudonoise code generator of the subscriber unit to more easily maintain synchronization with the pseudonoise code generator of the communications node. Additionally, when a succession of the transmitted messages of step 380 are comprised of messages which indicate a trend of timing advances or delays, the subscriber unit can perform a prediction as to the timing advance or delay needed at a time in the future. This enables the subscriber unit to maintain synchronization between updates in timing advance or delay indicators from communications node 200. This technique is employed without the utilization of GPS receivers, or, for example, when the reception of GPS signals is not possible.

A method and system for synchronous code division multiplexed communications in a satellite communications system of the present invention provides a means for increasing the number of users which can communicate with a node of the system. This results in more cost-efficient system operation as well as lowering subscriber costs. Additionally, through the use of multi-user detection, the synchronization accuracy is reduced while still achieving the benefits of synchronous code division multiplexed communications.

The foregoing description of the specific embodiments will so fully reveal the general nature of the invention that others can, by applying current knowledge, readily modify and/or adapt for various applications such specific embodiment without departing from the generic concept, and therefore such adaptations and modifications should and are intended to be comprehended within the meaning and range of equivalents of the disclosed embodiments.

It is to be understood that the phraseology or terminology employed herein is for the purpose of description and not limitation. Accordingly, the invention is intended to embrace all such alternatives, modifications, equivalents and variations as fall within the true spirit and broad scope of the appended claims.

What is claimed is:

1. A method of communicating code division multiplexed signals, comprising the steps of:
   advancing an internal code generator of a receiver in a time domain to compensate for a time delay of received timing signals;
   said received timing signals are provided by a low earth orbit satellite;
   the advancing step additionally comprises the step of combining said received timing signals with ephemeris data for said low earth orbit satellite in order to predict a time delay of future received timing signals; and
   communicating a code division multiplexed signal with a communications node using said internal code generator, said code division multiplexed signal being received synchronously by said communications node.

2. The method of claim 1, wherein said received timing signals are provided by a global positioning system satellite.

3. The method of claim 1, wherein the advancing step additionally comprises the step of using a plurality of previously received timing signals to predict a time delay of a future received timing signal.

4. The method of claim 1, wherein the communicating step additionally comprises the step of receiving a message which commands said internal code generator to incrementally advance based on a change in a time delay in a transmission to said communications node.

5. The method of claim 4, wherein the method additionally comprises the step of calculating a predicted timing advance based on a plurality of messages which command said internal code generator to incrementally advance.

6. The method of claim 4, wherein said receiver uses said message to correct an estimate of the location of said receiver.

7. The method of claim 1, wherein the communicating step additionally comprises the step of receiving a message which commands said internal code generator to incrementally delay based on a change in a time delay for a transmission from to said communications node.

8. The method of claim 7, wherein the method additionally comprises the step of calculating a predicted timing delay based on a plurality of messages which command said internal code generator to incrementally delay.

9. The method of claim 7, wherein the method additionally comprises the step of using at least one of said plurality of messages to correct an estimate of a geographical location of said receiver.

10. A method for communicating code division multiplexed signals with a subscriber unit, comprising the steps of:
    synchronizing a communications node internal code generator based on a signal from said subscriber unit;
    developing timing information based on said signal;
    conveying said timing information to said subscriber unit;
    the conveying step additionally comprises transmitting satellite ephemeris data to said subscriber unit to enable said subscriber unit to estimate a time delay; and
    communicating with said subscriber unit using code division multiplexed signals, wherein said subscriber unit adjusts an internal code generator based on a time delay associated with the receipt of said timing information in which signals are received synchronously at said communications node.

11. The method of claim 10, wherein the synchronizing step additionally comprises the step of synchronizing all codes to timing information from global positioning system satellites.

12. The method of claim 10, wherein the communicating step additionally comprises the step of conveying an indicator to incrementally advance timing of said internal code generator based on a change in said time delay in a transmission from said subscriber unit to said communications node.

13. The method of claim 10, wherein the communicating step additionally comprises the step of conveying an indicator to incrementally delay timing of said internal code generator based on a change in said time delay in a transmission from said subscriber unit to said communications node.

14. The method of claim 10, wherein the communicating step comprises the step of receiving a signal from a first and second subscriber and subtracting a cross-correlated output of said second subscriber from a correlated output of said first subscriber in order to reduce interference from said second subscriber in said signal of said first subscriber.

15. A subscriber unit, comprising:
    a receiver which receives a timing signal from a communications node;
    a timing offset element coupled to the receiver which adjusts timing of an internal code generator in response to said timing signal;
    a modulator coupled to a data source and said internal code generator which produces a code division multiplexed signal for transmission to said communications node, said code division multiplexed signal being offset so that a transmission from said subscriber unit is received synchronously at said communications node; and
    a memory unit coupled to said timing offset element which stores satellite ephemeris data, said satellite ephemeris data being used to estimate an adjustment of said internal code generator.

16. The system of claim 15, wherein said data source comprises a vocoder coupled to said modulator for transmitting voice data to said communications node.

17. In a communication system comprising moving satellite nodes, a method for communicating comprising the steps of:
    a subscriber unit code division modulating a voice signal with a pseudonoise code advanced by a time delay between a satellite node and the subscriber unit, the time delay changing as the satellite moves with respect to the earth's surface;
    receiving by the subscriber unit satellite ephemeris data from at least one satellite node to enable the subscriber unit to estimate a time delay;
    the subscriber unit transmitting the code division modulated voice signals to the satellite; and
    wherein the satellite correlates the received code division modulated voice signals with the pseudonoise code substantially synchronously with the code division modulated voice signal.

18. The method as claimed in claim 17 further comprising the steps of the subscriber unit:
    updating the time delay as the satellite node moves with respect to the subscriber unit; and
    in response to the updated time delay, changing an advancement of a pseudonoise code generator for performing the code division modulating step.

* * * * *